(12) United States Patent
Kim

(10) Patent No.: US 9,503,293 B2
(45) Date of Patent: Nov. 22, 2016

(54) COEFFICIENT ERROR ROBUST FEED FORWARD EQUALIZER

(71) Applicant: POSTECH ACADEMY-INDUSTRY FOUNDATION, Pohang-si, Gyeongsangbuk-do (KR)

(72) Inventor: Byungsub Kim, Pohang-si (KR)

(73) Assignee: POSTECH ACADEMY-INDUSTRY FOUNDATION, Pohang-Si, KyeongSangBuk-Do (KR)

(*) Notice: Subject to any disclaimer, the term of this patent is extended or adjusted under 35 U.S.C. 154(b) by 0 days.

(21) Appl. No.: 14/889,814

(22) PCT Filed: Apr. 30, 2014

(86) PCT No.: PCT/KR2014/003841
§ 371 (c)(1),
(2) Date: Nov. 6, 2015

(87) PCT Pub. No.: WO2014/182000
PCT Pub. Date: Nov. 13, 2014

(65) Prior Publication Data
US 2016/0105298 A1   Apr. 14, 2016

(30) Foreign Application Priority Data

May 7, 2013   (KR) .................. 10-2013-0051427
Apr. 30, 2014  (KR) .................. 10-2014-0052097

(51) Int. Cl.
*H03H 7/30* (2006.01)
*H04L 25/03* (2006.01)

(52) U.S. Cl.
CPC ... *H04L 25/03885* (2013.01); *H04L 25/03038* (2013.01); *H04L 25/03343* (2013.01)

(58) Field of Classification Search
CPC .................................. H04L 25/03885
USPC ........................................ 375/232
See application file for complete search history.

(56) References Cited

U.S. PATENT DOCUMENTS

| | | | |
|---|---|---|---|
| 6,240,133 B1* | 5/2001 | Sommer | H03H 21/0012 333/28 R |
| 2002/0057101 A1 | 5/2002 | Tang et al. | |
| 2005/0152488 A1* | 7/2005 | Buckwalter | H03H 11/265 375/350 |
| 2007/0104265 A1 | 5/2007 | Lin et al. | |
| 2010/0117690 A1* | 5/2010 | Doi | H03K 19/018528 327/108 |
| 2011/0182347 A1 | 7/2011 | Cheung | |

* cited by examiner

*Primary Examiner* — Lihong Yu
(74) *Attorney, Agent, or Firm* — Don D. Cha; Hamilton DeSanctis & Cha, LLP

(57) ABSTRACT

The present invention relates to a coefficient error robust feed forward equalizer and, more specifically, to a feed forward equalizing transmitter for baseband wired communication for preventing the influence of a coefficient error generated by the variation of nano-elements. The coefficient error robust feed forward equalizer according to one embodiment of the present invention comprises: a receiving terminal (130) for receiving input data (x) according to an integer time index (n), N number of delay units (D) connected with the input terminal (130) in series, a first calculator (110) for summing up tap signals outputted respectively from the N number of delay units (D); and a data change detection filter (120) for outputting a data transition value (b) on the basis of the change in the input data (x).

6 Claims, 12 Drawing Sheets

(a) 18dB channel loss at 1/(2T)
(b) 18dB channel loss at 1/(2T)
(c) 18dB channel loss at 1/(2T)
(d) 36dB channel loss at 1/(2T)

COEFFICIENT ERROR ROBUST FEED FORWARD EQUALIZER

TECHNICAL FIELD

The present invention relates to a coefficient error robust feed forward equalizing transmitter, and more particularly, to a feed forward equalizing transmitter based on baseband wired communication for preventing the influence of a coefficient error.

BACKGROUND ART

As processing capability of digital computing engines is enhanced, and techniques of using mutually connected networks are developed, high-bandwidth data transmission is needed. For a limited channel bandwidth, transmitted pulses are spread out in a unit period, and received signals are affected by inter-symbol interference.

A feed forward equalizer (FFE) is a channel compensation scheme that is widely used in high-speed baseband interconnection.

A complementary metal-oxide semiconductor (CMOS) integrated circuit equipped with an FFE transmitter may acquire a high data rate in a limited bandwidth. However, CMOS technology has developed on a nano scale. Thus, variation in devices has increased due to distortion, random variables, temperature fluctuation, aging, etc., and great coefficient errors occur due to variations in nano devices, and such coefficient errors degrade performance of and interrupt communication in a feed forward equalizer circuit.

In addition, in a high-speed operation having great channel loss, the influence of a coefficient error further increases.

Accordingly, robustness to coefficient errors should be secured when devices are continuously miniaturized and also a high data rate is required.

DISCLOSURE

Technical Problem

The present invention is proposed to solve the above problems and is directed to providing a feed forward equalizer that responds more robustly to a coefficient error while operating like a feed forward equalizing transmitter having a general structure in a normal state.

Technical Solution

A coefficient error robust feed forward equalizer includes a digital data input terminal (130) configured to acquire input data (x) according to an integer time index (n), N delay units (D) connected in series with the input terminal (130), a first calculator (110) configured to sum tap signals output from the N delay units (D); and a data change detection filter (120) configured to output a data transition value (b) based on a change in the input data (x).

Preferably, the data change detection filter (120) may be disposed between the input terminal and a first delay unit (D) connected adjacent to the input terminal, between two adjacent delay units (D) among the N delay units (D), or between the first calculator (110) and a last delay unit (D) connected adjacent to the first calculator (110).

Preferably, the data change detection filter (120) may include one delay unit (122) and a second calculator (121) connected with the delay unit (122), and the second calculator (121) may calculate the data transition value (b[n−m]) based on a previous value (x[n−m+1]) input to the delay unit (122) and a current value (x[n−m]) output from the delay unit (122).

Preferably, the data change detection filter (120) may calculate the data transition value based on the following equation:

$$b[n-m]=0.5x[n-m+1]-0.5x[n-m],$$

where n and m are integers (n>m).

Preferably, the data transition value (b[n−m]) may be calculated through logic circuit combination of a plurality of consecutive digital bit values in a data stream.

Preferably, the data change detection filter (120) may be a high-pass filter (HPF).

Preferably, each of the tap signals may include a feed forward equalizer coefficient (a), and the feed forward equalizer coefficient (a) may be adjustable by a user.

Advantageous Effects

The coefficient error robust feed forward equalizing transmitter according to the present invention operates identically to a general feed forward equalizer (FFE) when there is no coefficient error and also includes a simple logic circuit element and thus can improve robustness to a coefficient error with a small additional cost.

In addition, a high-pass transition detection filter installed in the coefficient error robust feed forward equalizer according to the present invention can reduce perturbation of a signal caused by a coefficient error and improve an eye diagram sensitivity indicating robustness of an interconnector by a factor of 7 to 17.

Furthermore, the coefficient error robust feed forward equalizer according to the present invention can be easily applied to high-speed interconnect because an improvement rate of an eye sensitivity increases as the data rate and the channel loss increase.

The effect of the present invention is not limited to those mentioned above, but other effects not described herein will be clearly understood by those skilled in the art from descriptions below.

MODES OF THE INVENTION

Figure 1:
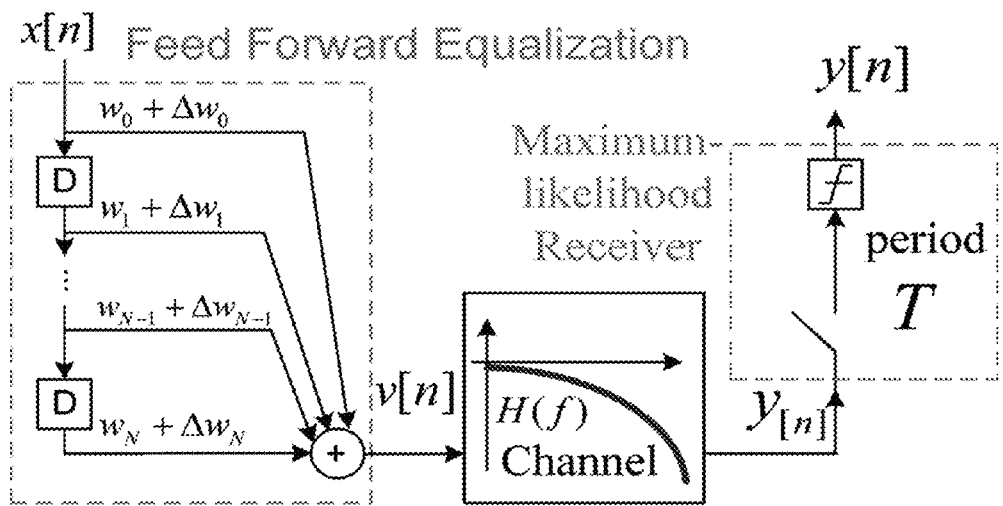
FIG. 1 is a conceptual view of a high-speed interconnect system including a conventional feed forward equalizing transmitter.

Hereinafter, a coefficient error robust feed forward equalizing transmitter according to the present invention will be described in detail with reference to the drawings. Among the reference numerals added to indicate elements in each figure, it should be noted that like elements already shown in other figures are denoted with like reference numerals wherever possible. Moreover, detailed descriptions related to well-known functions or configurations will be omitted in order not to unnecessarily obscure subject matters of the present invention.

As shown in FIG. 1, a conventional general feed forward equalizer for high-speed interconnect is configured to include a channel, a feed forward equalizing transmitter (FFE Tx), and a 1-bit quantizing receiver (Rx). Here, the channel includes a coaxial cable, a backplane, a printed circuit board (PCB), a package, and on-chip wires, and has a typical length from several centimeters to several tens of meters.

When the data rate is in the range from several Gb/s to several tens of Gb/s, the channel usually serves as a low-pass filter (LPF), and inter-symbol interference (ISI) is generated in the channel.

When the channel loss is large at the Nyquist frequency, the inter-symbol interference seriously interrupts communication. In general, the channel loss is determined to be small in the range of 0 to 10 dB, large in the range of 10 to 20 dB, and very large in the range of 20 to 30 dB. Accordingly, it is known that there are few cases in which a channel has a channel loss greater than 30 dB, and communication through such a channel is extremely difficult. There is a need to design a feed forward equalizing (FFE) transmitter that may secure reliability under such environments.

Referring to FIG. 1, the feed forward equalizing transmitter (FFE Tx) is used to compensate for the channel loss and secure a data rate.

In general, the feed forward equalizer (FFE) is expressed as a finite impulse response filter having a tap coefficient $\underline{w}=[w_0 \; w_1 \; \ldots \; w_N]^T$ and a coefficient error $\Delta\underline{w}=[\Delta w_0 \; \Delta w_1 \; \ldots \; \Delta w_N]^T$.

Generally, the appropriate number of taps is 2 to 5. The feed forward equalizer (FFE) having an appropriate tap coefficient $\underline{w}$ operates as a high-pass filter that compensates for the channel loss in order to convert a signal y[n] reaching the receiver (Rx) into a 2-level pulse amplitude modulation (PAM2) signal. y[n] corresponds to a value when x[n−m] reaches the receiver (Rx). Here, x[n] is a transmitted data sequence and has a signal level of 1 (a bit of '1') or −1 (a bit of '0'). In this case, m denotes a delay time until x[n] is received by the receiver through the channel.

The 1-bit quantizing device of the receiver samples y[n] with a period T and then determines a value of ŷ[n] on the basis of zero (0). In this case, ŷ[n] has a value of 1 when ŷ[n] is greater than zero and a value of −1 otherwise.

In general, for such an interconnect, since a complex coding technique requires a high cost and has a small level of white noise, a general receiver depends on an eye diagram acquired through the feed forward equalizer (FFE).

Accordingly, minimizing the inter-symbol interference (ISI) and maximizing the eye diagram are important factors to enhance the efficiency of an interconnect system.

Figure 2:
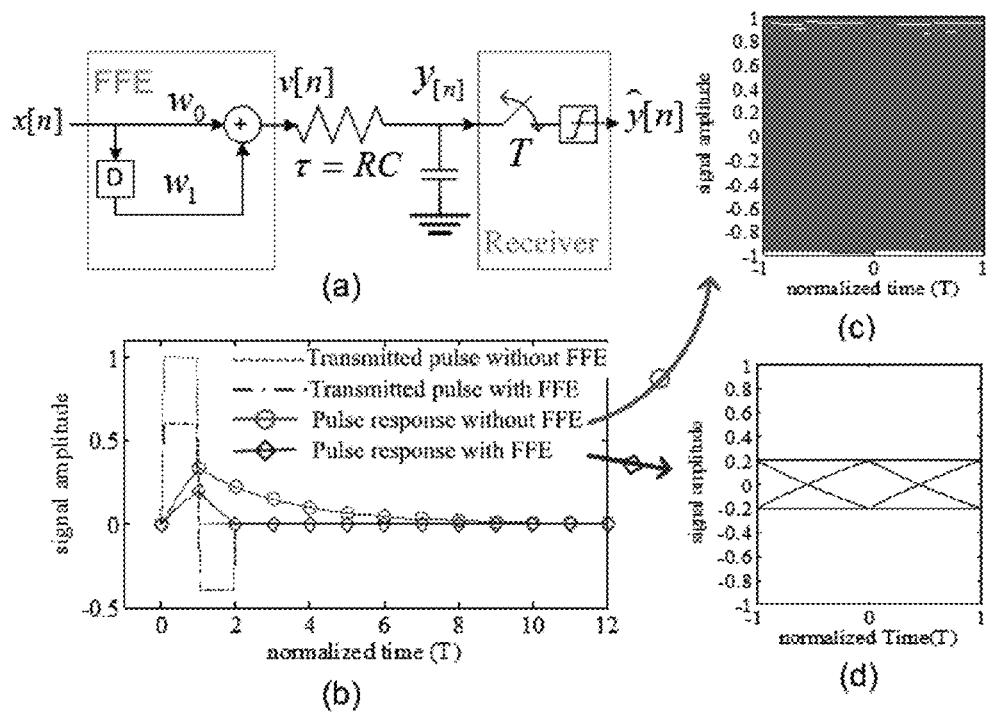
FIG. 2 is an exemplary view showing a conventional feed forward equalizer.

FIG. 2A is an exemplary diagram of the simplest and most general structure of a 2-tap feed forward equalizer (2-tap FFE).

The wiring is modeled as a primary RC circuit having a time constant τ.

A continuous time pulse response h(t) of the system is defined as $u(t)(1-e^{-t/\tau})-u(t-T)(1-e^{-(t-T)/\tau})$, where u(t) denotes a unit step function. Referring to FIG. 2B, the continuous time pulse response of the system is expressed as a circle and shown as a solid line graph (pulse response without FFE).

A discrete time pulse response h[n] of this channel is h(nT) and may be expressed as Equation (1) below:

$$h[n]=0 \text{ if } n\leq 0, \text{ or } h[n]=(1-e^{-T/\tau})e^{-(n-1)T/\tau} \text{ if } n>0 \quad \text{[Equation 1]}$$

where, n: integer time index
h[n]: discrete time impulse response
T: data period
τ: time constant.

According to FIG. 2B, since the data period T is much smaller than the time constant τ, it can be seen that the impulse response h(t) of a system not equipped with the feed forward equalizer (FFE) has a longer inter-symbol interference (ISI) tail than an impulse response of a system equipped with the feed forward equalizer (FFE).

According to Equation (1), when n≥1, h[n] decreases exponentially by $h[n-1]e^{-T/\tau}$. Thus, the inter-symbol interference (ISI) may be completely removed from the channel through the 2-tap feed forward equalizer (2-tap FFE) having an optimal feed forward equalizer coefficient (optimal FFE coefficient) as shown in Equation (2) below:

$$\underline{w}_{opt}=[1/(1+e^{-T/\tau})-e^{-T/\tau}/(1+e^{-T/\tau})]^T \quad \text{[Equation 2]}$$

where, $\underline{w}_{opt}$: optimal FFE coefficient
T: data period
τ: time constant.

When the unit impulse function δ[n] is input as x[n], the feed forward equalizer (FFE) transforms a transmitted pulse to be undershot as shown with a long blue dotted line in FIG. 2B, in order to remove the inter-symbol interference (ISI) tail. As a result, a discrete time pulse response g[n] of the system equipped with the feed forward equalizer (FFE) is not affected by the inter-symbol interference as shown with a diamond shape and a solid line in FIG. 2B and completely opens an eye diagram as shown in FIG. 2D.

According to characteristics of a linear time invariant (LTI) system, an optimal value $g_{opt}[n]$ of the discrete time pulse response g[n], which is defined as h[n]*w[n], is found using Equation (3) below:

$$g_{opt}[n]=(1-e^{-T/\tau})/(1+e^{-T/\tau}) \text{ if } n=1, \text{ or } g[n]=0 \text{ if } n\neq 1 \quad \text{[Equation 3]}$$

Referring to FIG. 2C, when the feed forward equalizer (FFE) is not installed, it can be seen that the eye diagram is closed, and thus the feed forward equalizer (FFE) may improve the eye diagram.

A least square method (least square error (LSE)) is used to determine a coefficient of the feed forward equalizer (FFE) in various channels. The coefficient $w_{lse}[n]$ of the conventional feed forward equalizer (C-FFE), which is a value of the least square method, is a value for minimizing a distance between g[n](=h[n]*w[n]) and δ[n−m], and is expressed as Equation (4) below:

$$w_{lse}[n] = \mathop{\text{argmin}}_{w[n]} \|h[n]*w[n] - \delta[n-m]\|_2. \quad \text{[Equation 4]}$$

Equation (4) may be approximated to Equation (5) using a vector and a matrix in order to find a value of the least square method. $\underline{w}_{lse}$ and h are truncated vectors of $w_{lse}[n]$ and h[n], respectively. $\underline{h}_k$ and $\underline{\delta}_{-m}$ are column vectors having h[n+k−1] and δ[n−m−1] as nth elements, respectively. $\underline{h}$ is represented as $H=[\underline{h}\ \underline{h}_{-1}\ \underline{h}_{-2}\ \ldots\ \underline{h}_{-n}]$.

$$\underline{w}_{lse} \approx \mathop{\text{argmin}}_{\underline{w}} \|H\underline{w} - \underline{\delta}_{-m}\|_2 = (H^TH)^{-1}H^T\underline{\delta}_{-m}. \quad \text{[Equation 5]}$$

In general, a maximum value |v[n]| of a signal transmitted by the feed forward equalizing (FFE) transmitter shown in FIG. 1 has constraints shown in Equation (6). Accordingly, in order to satisfy Equation (5), $w_{lse}[n]$ is normalized, as shown in Equation (7).

$$\max|v[n]|=|w[0]|+|w[1]|+|w[2]|+\ldots+|w[N]|\leq 1 \quad \text{[Equation 6]}$$

Accordingly, in order to satisfy Equation (6), $w_{lse}[n]$ may be normalized as shown in Equation (7) below:

$$w_{opt} = \frac{w_{lse}}{\|\underline{w}_{lse}\|_1} = \frac{w_{lse}}{\sum_{\forall n}|w_{lse}[n]|}. \quad \text{[Equqation 7]}$$

For convenience of description of embodiments of the present invention, a conventional feed forward equalizing transmitter is referred to as C-FFE, and an equalizing transmitter for preventing the influence of a coefficient error according to the present invention is referred to as B-FFE.

Hardware implementation of the conventional feed forward equalizer (C-FFE) and relevant coefficient errors are as follows.

Figure 3:
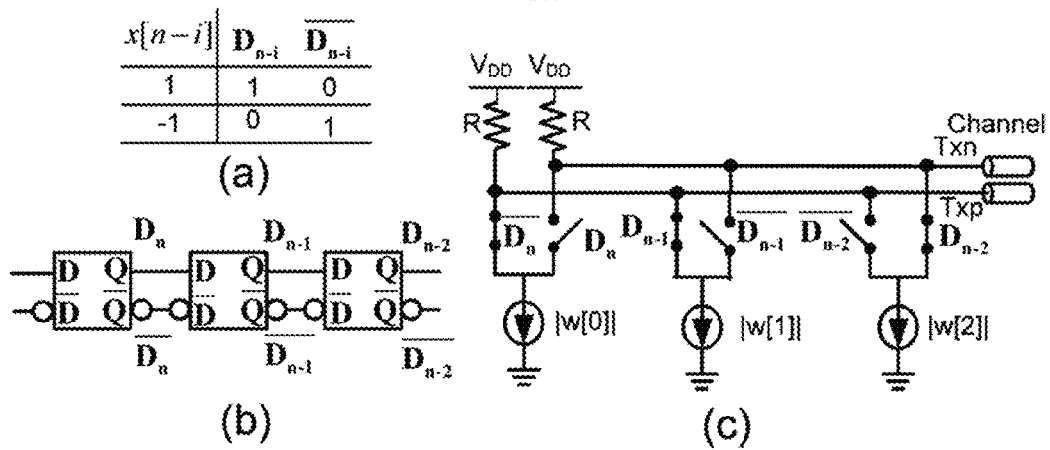
FIG. 3 is a conceptual view of a conventional 3-tap feed forward equalizer.

FIG. 3 shows a structure of a conventional 3-tap feed forward equalizing transmitter. A flip-flop or latch shown in FIG. 3B operates as a delay unit (D) of FIG. 1. An output $D_{n-i}\overline{D_{n-i}}$ of the latch represents x[n−i] and has a value determined according to a truth table of FIG. 3A.

A differential current logic (CML) circuit of FIG. 3B determines a direction of tail current |w[i]| according to a value of the output $D_{n-i}\overline{D_{n-i}}$ of the latch and calculates the sum of w[i]x[n−i], as shown in Equation (8) below, by adding the output values of the latch to output nodes Txp and Txn. Here, $V_{Tx}$ between Txp and Txn is a Thevenin-equivalent differential voltage corresponding to v[n] of FIG. 1.

$$V_{Tx} = (V_{dd} - RI_{Txp}) - (V_{dd} - RI_{Txn}) \quad \text{[Equation 8]}$$
$$= R(I_{Txn} - I_{Txp})$$
$$= R(w[0]x[n] + w[1]x[n-1] + w[2]x[n-2]).$$

In this case, when $V_{Tx}$ is too high, a transistor operates in an undesired state. Thus limitations are needed as shown in the above Equation (6).

The feed forward equalizing transmitter is susceptible to a coefficient error that is mainly generated due to variation of a nano device.

That is, a current source and a coefficient |w[n]|, which are shown in FIG. 3C, are sensitive to the variation caused by nanoscale technology. The variation cannot secure the robustness because the variation is not easy to control through micrometer technology.

As shown in FIG. 1, the influence caused by variation of the nano device may be modeled as the constant random variable $\Delta\underline{w}$ added to the coefficient $\underline{w}$. The variation is caused by the distortion, random variables, temperature fluctuation, aging, etc., during the process. The causes occur very slowly over several minutes to years because of a manufacturing process, a change in circuit operation, etc. Thus, the random number modeling such as $\Delta w$ is suitable for a coefficient error that has occurred during transmission.

Figure 4A:
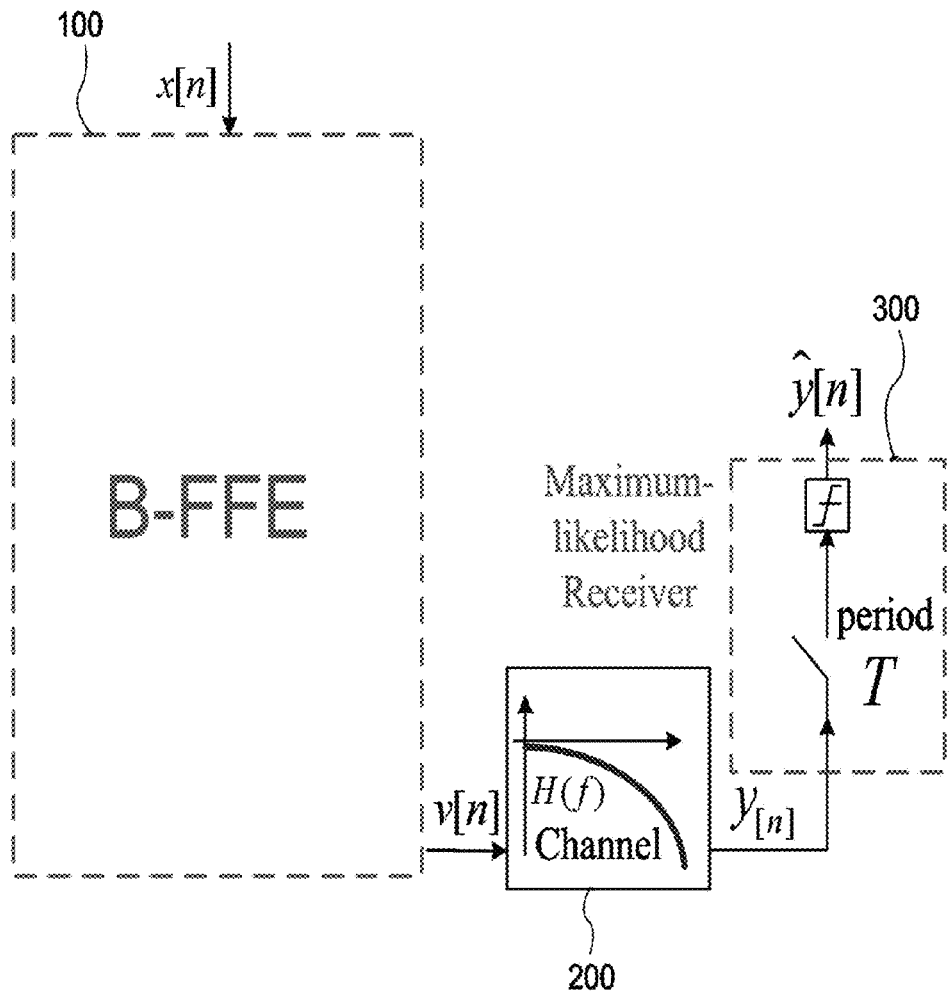
FIG. 4A is a block diagram of a high-speed interconnect system including a coefficient error robust feed forward equalizing transmitter according to an embodiment of the present invention.

A feed forward equalizer 100 according to an embodiment of the present invention will be described in detail below with reference to FIGS. 4A and 4B. FIG. 4A is a block diagram of a high-speed interconnect system including a coefficient error robust feed forward equalizer (B-FFE) 100 according to an embodiment of the present invention, and FIG. 4B is a block diagram specifically showing a coefficient error robust feed forward equalizer (B-FFE) 100 according to an embodiment of the present invention.

As shown in FIG. 4A, the high-speed interconnect system including the coefficient error robust feed forward equalizer (B-FFE) 100 according to an embodiment of the present invention is configured to include a feed forward equalizer (B-FFE) 100, a receiver 300 configured to receive an output of the feed forward equalizer (B-FFE) 100, and a channel 200 for communication between the feed forward equalizer (B-FFE) 100 and the receiver 300.

The receiver 300 and the channel 200 were mentioned above in description of the conventional high-speed interconnect system. The coefficient error robust feed forward equalizer (B-FFE) 100 according to an embodiment of the present invention will be described in detail below with reference to FIG. 4B.

Figure 4B:
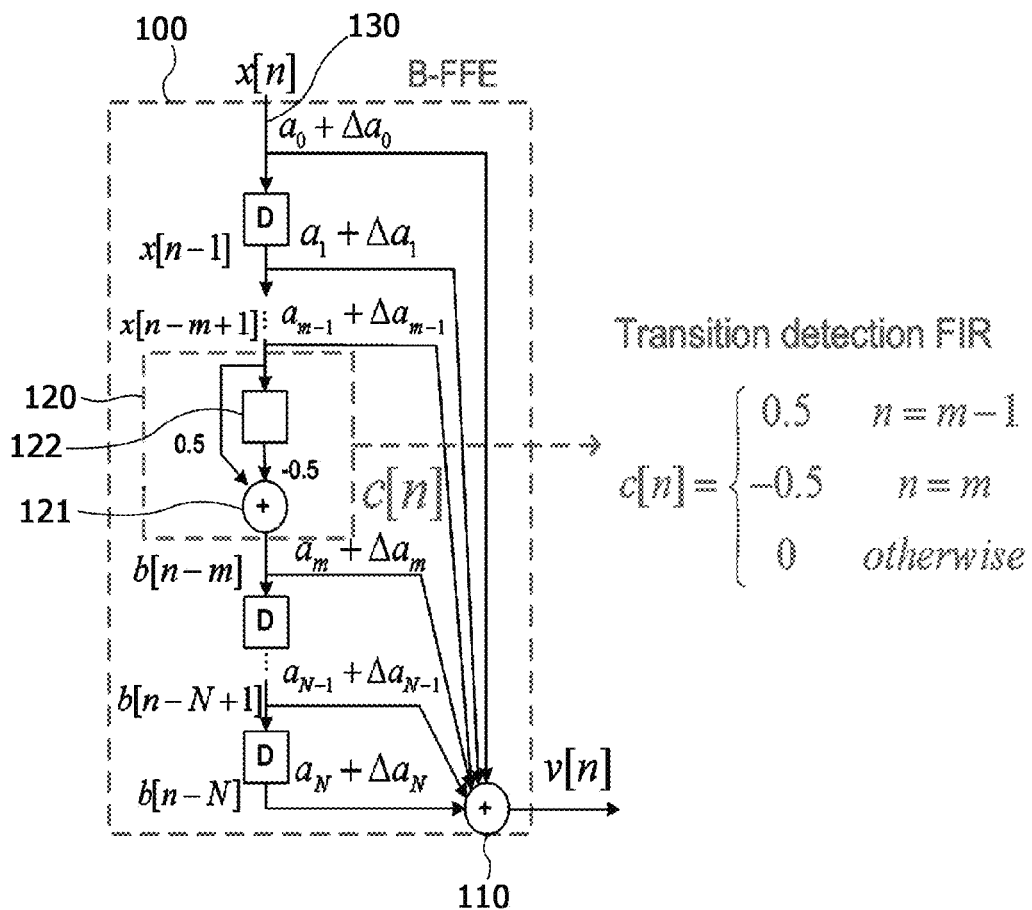
FIG. 4B is a block diagram specifically showing a coefficient error robust feed forward equalizing transmitter according to an embodiment of the present invention.

As shown in FIG. 4B, the coefficient error robust feed forward equalizer (B-FFE) 100 according to an embodiment of the present invention includes an input terminal 130, N delay units D, a first calculator 110, and a data change detection filter 120. The input terminal 130 is configured to take input data x according to an integer time index n. x[n] is a transmitted data sequence and has a signal level of 1 (a bit of '1') or −1 (a bit of '0'). In this case, m denotes a delay time until x[n] is received by the receiver through the channel. The N delay units D are connected in series with the input terminal 130. The first calculator 110 performs a function of summing tap signals output from the N delay units D. Last, the data change detection filter 120 performs a function of outputting a data transition value b on the basis of the change in input data x. The coefficient error robust feed forward equalizer (B-FFE) 100 according to an embodiment of the present invention will be described in detail below, focusing on the data change detection filter 120.

As shown in FIG. 4B, the data change detection filter 120 of the coefficient robust feed forward equalizer (B-FFE) 100 according to an embodiment of the present invention can be disposed between two adjacent delay units D among N delay units D, between the input terminal 130 and the first delay unit D connected adjacent to the input terminal 130, or between the first calculator 110 and the last delay unit D connected adjacent to the first calculator 110.

In detail, the data change detection filter 120 includes one delay unit 122 and a second calculator 121 connected with the delay unit 122. In particular, the second calculator 121 performs a function of calculating the data transition value b[n−m] on the basis of a previous value x[n−m+1] input to the delay unit 122 and a current value x[n−m] output from the delay unit 122.

A process in which the data change detection filter 120 calculates the data transition value will be described in more detail. In FIG. 4B, x[n] is a value indicating input data, and b[n−m] is a value indicating data transition of x[n]. In addition, c[n] is a high-pass filter (HPF) that detects the change in data. c[m−1] is 0.5, c[m] is −0.5, and c[n] is 0 when n is an integer excluding m−1 or m. That is, c[n] is defined as a value that converts x[n−m+1] into b[n−m], as shown in Equation (9) below:

$$b[n-m]=0.5x[n-m+1]-0.5x[n-m]=c[n]*x[n] \quad \text{[Equation 9]}$$

where, x[n]: input data b[n−m]: transition of input data c[n]: data change detection high-pass filter.

b[n−m] may have a value of −1, 0, or 1. When b[n−m] is −1, x[n] changes from 1 to −1. When b[n−m] is 1, x[n] changes from −1 to 1. When b[n−m] is 0, x[n] does not change. That is, b[n−m] includes information about the change in x[n].

As a result, the data transition value that is calculated and output using the above Equation (9) becomes −1 when data input to the data change detection filter 120 is changed from 1 to −1, becomes 1 when the data input to the data change detection filter 120 is changed from −1 to 1, and becomes 0 when the input data does not change.

In addition, the coefficient error robust feed forward equalizer according to an embodiment of the present invention can calculate the data transition value b[n−m] through logic circuit combination of a plurality of consecutive digital bit values in a data stream.

Figure 5:
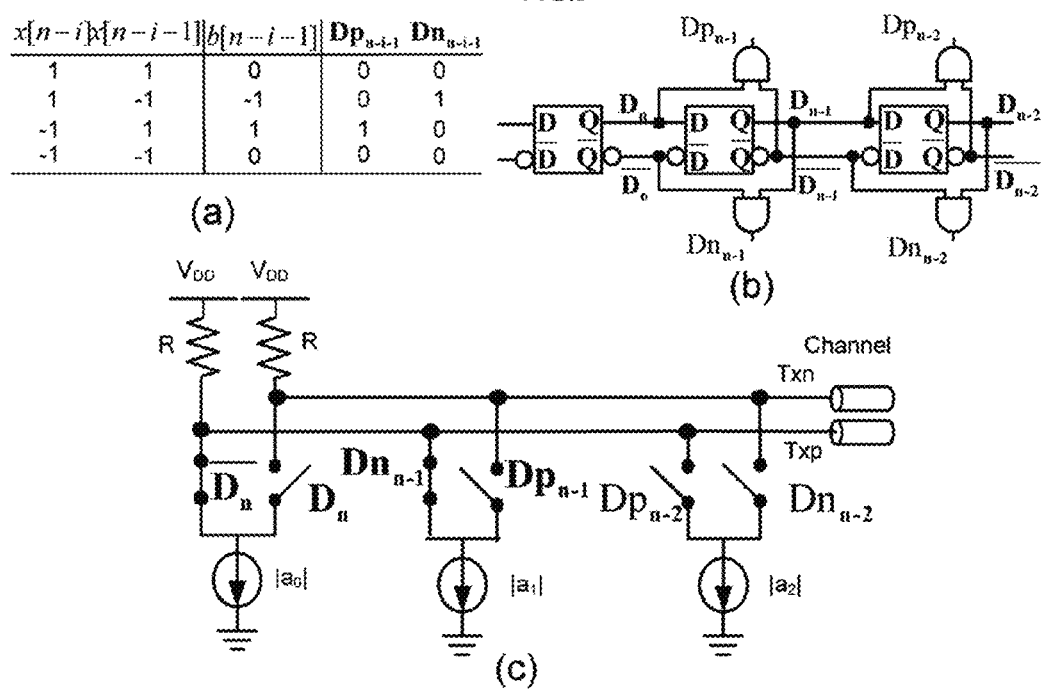
FIG. 5 is an exemplary view of a 3-tap equalizer of a coefficient error robust feed forward equalizer according to the present invention.

FIG. 5A is a truth table that represents Equation (9) of the 3-tap coefficient error robust feed forward equalizer (B-FFE) according to an embodiment of the present invention and a table showing a value of b[n−i−1] using two digital bits $D_{pn-i-1}$ and $D_{nn-i-1}$. In this case, the two digital bits $D_{pn-i-1}$ and $D_{nn-i-1}$ are formed using AND gates, as shown in FIG. 5B.

FIG. 5C is a block diagram of a circuit for calculating a sum and coefficient product of the 3-tap coefficient error robust feed forward equalizer (B-FFE) according to an embodiment of the present invention. The calculation circuit is of the same type as the conventional feed forward equalizer (C-FFE) CML circuit. Since the cost of the AND gate is very low, nanoscale CMOS technology is economically beneficial when the B-FFE according to embodiments of the present invention is implemented.

In addition, tap signals are output from N delay units D of the coefficient error robust feed forward equalizer (B-FFE) 100 according to an embodiment of the present invention. The tap signal includes a feed forward equalizer coefficient a and a constant random coefficient error Δa. In particular, the feed forward equalizer coefficient a is preferably configured to be adjusted by a user in order to mathematically map the coefficient error robust feed forward equalizer (B-FFE) according to an embodiment of the present invention to be the same as the conventional feed forward equalizer (C-FFE) in a normal state.

In order to describe this in detail, when Equation (9) is rearranged using a vector and a matrix, b[n] may be represented as $B_x\underline{x}[n]$. In this case, it is defined that $\underline{b}[n]=[x[n]\ x[n-1]\ \ldots\ x[n-m+1],\ b[n-m]\ b[n-m-1]\ \ldots\ b[n-N]]T$, $\underline{x}[n]=[x[n]\ x[n-1]\ x[n-2]\ \ldots\ x[n-N]]^T$. $B_x$ is expressed as Equation (10) below ($B_x$ is an (N+1)×(N+1) matrix, and an identity matrix at the upper left corner of $B_x$ is an m×m matrix):

$$B_X = \begin{bmatrix} 1 & 0 & 0 & \cdots & 0 & 0 & 0 & \cdots & 0 \\ 0 & 1 & 0 & \cdots & 0 & 0 & 0 & \cdots & 0 \\ 0 & 0 & 1 & \cdots & 0 & 0 & 0 & \cdots & 0 \\ \vdots & \vdots & \vdots & \ddots & 0 & 0 & 0 & \cdots & 0 \\ 0 & 0 & 0 & 0 & 1 & 0 & 0 & \cdots & 0 \\ 0 & 0 & 0 & 0 & 0.5 & -0.5 & 0 & \cdots & 0 \\ 0 & 0 & 0 & 0 & 0 & 0.5 & -0.5 & \cdots & 0 \\ \vdots & \vdots & \vdots & \vdots & \vdots & \vdots & \vdots & \ddots & 0 \\ 0 & 0 & 0 & 0 & 0 & 0 & 0 & 0.5 & -0.5 \end{bmatrix} \quad \text{[Equation 10]}$$

v[n] of the conventional feed forward equalizer (C-FFE) is $\underline{x}[n]^T\underline{w}$. Thus, any conventional feed forward equalizer (C-FFE) may use $v[n]=\underline{b}[n]^T\underline{a}=\underline{x}[n]^TB_x^T\underline{a}$ and $v[n]=\underline{x}[n]^T\underline{w}$ to derive the coefficient $\underline{a}=[a_0\ a_1\ \ldots\ a_n]^T$, which is exactly the same as that of the coefficient error robust feed forward equalizer (B-FFE) according to the present invention, as shown in Equation (11) and Equation (12) below:

$$\underline{w}=B_x^T\underline{a} \quad \text{[Equation 11]}$$

$$\underline{a}=(B_x^T)^{-1}\underline{w} \quad \text{[Equation 12]}$$

The feed forward equalizer coefficient a of the feed forward equalizing transmitter (B-FFE) 100 according to an embodiment of the present invention can be mapped to a feed forward equalizer coefficient $\underline{w}$ of the conventional feed forward equalizer (C-FFE), using the above Equation (11) and Equation (12). Thus, the feed forward equalizer (B-FFE) 100 according to an embodiment of the present invention may have functions of all conventional feed forward equalizers (C-FFEs) implemented therein as well as being more robust to a coefficient error than the conventional feed forward equalizer (C-FFE).

As described above, the influence of variation of a device that occurs in the coefficient robust feed forward equalizer (B-FFE) according to the present invention is modeled in the form of the constant random coefficient error Δ$\underline{a}$ added to the feed forward equalizer coefficient $\underline{a}$.

A method of securing robustness of the coefficient error robust feed forward equalizer (B-FFE) according to the present invention will be described below. A 2-tap coefficient error robust feed forward equalizer in a primary RC channel according to an embodiment of the present invention will be described as an example.

The feed forward equalizer (FFE) is a linear time-invariant (LTI) system and thus may analyze the influence of a coefficient error from perturbation of a pulse response.

$\Delta y[n]$, which is perturbation of $y[n]$, may be obtained by substituting a nominal coefficient of the feed forward equalizer (FFE) with zero (0). That is, Equation (13), which is associated with the conventional feed forward equalizer (C-FFE), may be derived by substituting $w[n]$ shown in FIG. 1 with zero (0).

$$\Delta y[n] = (\Delta w[n] * h[n]) * x[n] = \sum_{m=0}^{N}(h_{\Delta w[m]}[n] * x[n]). \quad \text{[Equation 13]}$$

$h_{\Delta w[m]}[n]$ defined as $\Delta w[m]h[n-m]$ in Equation (13) denotes the influence of the coefficient error $\Delta w[m]$ to $\Delta y[n]$ when the input data $x[n]$ is transmitted.

In this case, referring to Equation (13), $\Delta y[n]$ is a value of summing all possible influences of the coefficient error $\Delta w[m]$. Thus, the perturbation of the feed forward equalizer (FFE) system may be expressed using all $h_{\Delta w[m]}[n]$, like a general pulse response. Accordingly, $h_{\Delta w[m]}[n]$ may be defined as a coefficient error pulse of $\Delta w[m]$. Referring to FIG. 4, the pulse response change $\Delta y[n]$ of the coefficient error robust feed forward equalizer (B-FFE) according to the present invention may be derived as shown in Equation (14) below:

$$\Delta y[n] = \quad \text{[Equation 14]}$$
$$\left(\sum_{k=0}^{m-1}\Delta a[k]h[n-k] + \sum_{k=m}^{N}\Delta a[k]h[n-k]*c[n]\right)*x[n] = $$
$$\sum_{k=0}^{N}(h_{\Delta a[k]}[n]*x[n]).$$

In Equation (14), $h_{\Delta a[m]}[n]$ is a coefficient error pulse response of $\Delta a[m]$. When $0 \le k \le m-1$, $h_{\Delta a[k]}[n]$ is defined as $\Delta a[k]h[n-k]$. When $m \le k \le N$, $h_{\Delta a[k]}[n]$ is defined as $\Delta a[k]h[n-k]*c[n]=0.5\Delta a[k](h[n-k-m+1]-h[n-k-m])$.

Figure 6:
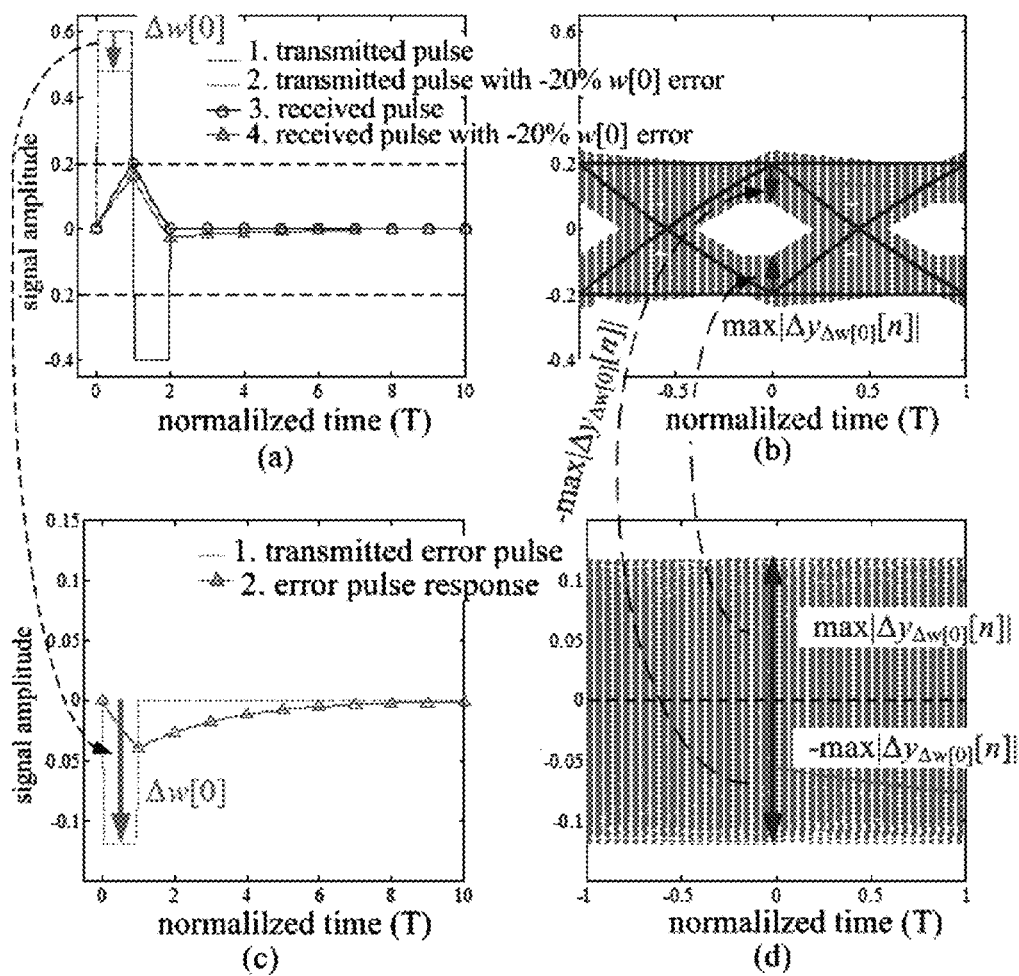
FIG. 6 is a graph showing a simulation result of a coefficient error influence of a conventional 2-tap feed forward equalizer.

FIG. 6 is a view showing a simulation result of an influence of $\Delta w[0]$ in the conventional 2-tap feed forward equalizer (2-tap C-FFE) equipped to compensate for loss in the primary RC channel. When the coefficient error does not occur, a pulse response without the inter-symbol interference (ISI) may be checked as shown in FIG. 6A. The check result makes a perfect eye diagram as shown with a solid line in FIG. 6B.

However, when a pulse and a response in which the coefficient error $\Delta w[0]$ is transmitted are slightly changed from a normal state, as shown with 2 or 4 of FIG. 6A, spreading has occurred in upper and lower portions of the eye diagram as shown in FIG. 6B. That is, as shown in FIG. 6D, the maximum of the spreading of the eye diagram in FIG. 6B is the same as the maximum of the eye diagram of $\Delta y_{\Delta w[0]}[n]$, which is represented using $\Delta y[n]$ when there is only an error of $\Delta w[0]$.

When the eye height decreased when there is only a $\Delta w[0]$ error is defined as $\Delta v_{eye,\Delta w[0]}$, $\Delta v_{eye,\Delta w[0]}$ may be represented as $2\max|\Delta y_{\Delta w[0]}[n]|$.

As shown in FIG. 6C, $h_{\Delta w[0]}[n]$ is an RC response that decreases exponentially. Thus, $\max|\Delta y_{\Delta w[0]}[n]|$ occurs when $x[n]=1$ or $-1$ for all n. In this case, when it is assumed that an error ratio is $\alpha_0$, the coefficient error $\Delta w[0]$ may be represented as $\alpha_0 w[0]$. Thus, $\max|\Delta y_{\Delta w[0]}[n]|$ may be derived from Equation (1), Equation (2), and Equation (13), as shown in Equation (15) below:

$$\max|\Delta y_{\Delta w[0]}[n]| = \max|\Delta w[0]h[n]*x[n]| = \quad \text{[Equation 15]}$$
$$|\Delta w[0]||\Sigma\forall_n h[n]| = |\Delta w[0]| = |\alpha_0|/(1+e^{-T/\tau}).$$

In addition, when definition of $\Delta w[0]$ is applied to $\Delta w[1]$, $\max|\Delta y_{\Delta w[1]}[n]|$ may be derived as shown in Equation (16) below:

$$\max|\Delta y_{\Delta w[1]}[n]| = \max|\Delta w[1]h[n-1]*x[n]| = \quad \text{[Equation 16]}$$
$$|\Delta w[1]||\Sigma\forall_n h[n]| = |\Delta w[1]| = |\alpha_1|e^{-T/\tau}/(1+e^{-T/\tau}).$$

In FIG. 6D, $\Delta w[0]$ is $-0.12$ and is 20% of $w[0]$, which is 0.6. Accordingly, when T is $0.4\tau$, $\max|\Delta y_{\Delta w[0]}[n]|$ is 0.12, and the eye height $\Delta v_{eye,\Delta w[0]}$ decreased as shown in FIG. 6B is $0.4-0.16=2\max|\Delta y_{\Delta w[0]}[n]|=0.12\times 2=0.24$.

Figure 7:
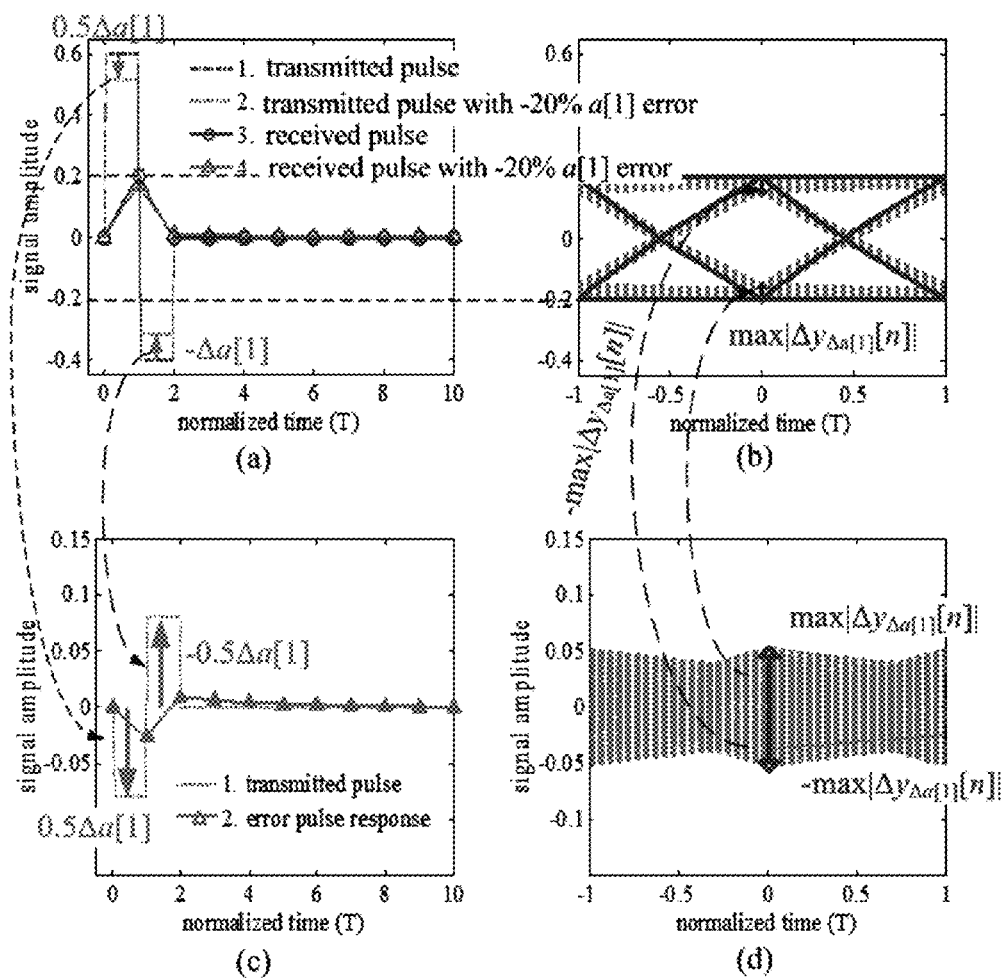
FIG. 7 is a graph showing a simulation result of a coefficient error influence of a coefficient error robust feed forward equalizer according to the present invention.

FIG. 7 is a view showing a simulation result of an influence of $\Delta a[1]$ ($=-0.2a[1]$) when the coefficient error robust feed forward equalizer (B-FFE) according to the present invention is installed instead of the conventional feed forward equalizer (C-FFE) in FIG. 6. Since the conventional feed forward equalizer (C-FFE) operates identically to the coefficient error robust feed forward equalizer (B-FFE) in a normal state, a pulse response without the inter-symbol interference (ISI) may be acquired as shown in 3 of FIG. 7A, and it may be checked that there is no spreading of an eye diagram as shown with a solid line in FIG. 7B.

Referring to 4 of FIG. 7A, $\Delta a[1]$ changes a pulse response, and spreads the eye diagram as shown with a dotted line of FIG. 7B.

However, in the coefficient error robust feed forward equalizer (B-FFE) according to the present invention, $c[n]$ shown in FIG. 4 operates as a high-pass filter (HPF). Thus, as seen in 1 of FIG. 7C, perturbation of a transmitted pulse is changed to decrease $h_{\Delta a[1]}[n]$.

As a result, comparing FIG. 7C and FIG. 6C, $h_{\Delta n[1]}[n]$ of FIG. 7C is significantly lower than $h_{\Delta w[0]}[n]$ of FIG. 6C. Thus, it can be seen that the spreading of the eye diagram in FIGS. 7D and 7B becomes much weaker than that in FIG. 6D and FIG. 6B.

Assuming that an error ratio is $\beta_n$ similar to $\alpha_n$ of Equation (15) and Equation (16), $h\Delta a[m][n]$ may be derived using $\Delta a[m]=\beta_n a[m]$, as shown in Equation (17) and Equation (18) below:

$$h_{\Delta a[0]}[n] = \Delta a[0]h[n] = \begin{cases} 0 & n < 1 \\ \beta_0 \dfrac{(1-e^{-T/\tau})^2}{1+e^{-T/\tau}}e^{-(n)T/\tau} & n \ge 1 \end{cases} \quad \text{[Equation 17]}$$

$$h_{\Delta a[1]}[n] = \quad \text{[Equation 18]}$$
$$\Delta a[1]h[n]*c[n] = \begin{cases} 0 & n < 1 \\ \beta_1 \dfrac{e^{-T/\tau}(1-e^{-T/\tau})}{1+e^{-T/\tau}} & n = 1 \\ -\beta_1 \dfrac{(1-e^{-T/\tau})^2 e^{-(n-1)T/\tau}}{1+e^{-T/\tau}} & n \ge 2 \end{cases}.$$

c[n] does not change $h_{\Delta a[0]}[n]$. Therefore, $h_{\Delta n[0]}[n]$ decreases exponentially like $h_{\Delta w[0]}[n]$ or $h_\Delta w[1][n]$, but does not exhibit a perturbation reduction effect that occurs in $h_{\Delta n[1]}[n]$. However, since a normal value a[0] is a small value, |Δa[0]| generally has a much smaller value than |Δw[0]|, |Δw[1]|, and |Δa[1]|, as shown in Equation (19):

$$a[0] \approx 4|H(f_N)|/\pi \qquad \text{[Equation 19]}$$

where,

H(f): frequency response of channel $f_N$: Nyquist frequency.

Equation (19) can be derived as follows. First, x[n]='..., 1, −1, 1, −1, 1, ...' converts v(t) (a continuous time signal corresponding to v[n]) into a square wave. Accordingly, a first harmonic signal (1$^{st}$ harmonic) $v_{1st}(t)$ becomes 4 sin $(2f_N t)/\pi$. Since the channel is a low-pass filter (LPF), $y_{1st}(t)$ (a first harmonic signal of a continuous time signal y(t) corresponding to y[n]) is dominant in a receiver. When channel distortion is well compensated for, the following approximation $|y_{1st}(t)|a[0]$ is possible, and thus y1st(t) a[0] sin($2\pi f_N t$). In this case, at the Nyquist frequency $f_N$, $|y_{1st}(t)|$ $|v_{1st}(t)||H(f_N)|$.

According to Equation (19), a[0] may be predicted within an error range of about 20%. It can be seen that a[0] is a much smaller value than other coefficients through Equation (19). In this embodiment, assuming the same coefficient error of 20%, |Δa[0]| is 0.04 while |Δw[0]|=0.12, |Δw[1]|=0.08, and |Δa[1]|=0.16.

Using Equation (14), Equation (17), and Equation (18), which represent the influence of Δa[0] and Δa[1], max|Δy$_{\Delta a[0]}$[n]| and max|Δy$_{\Delta a[1]}$[n]|, which are the worst perturbation values, may be calculated as shown in Equation (20) and Equation (21) below:

$$\max|\Delta y_{\Delta a[0]}[n]| = \max|\Delta a[0]h[n] * x[n]| = \qquad \text{[Equation 20]}$$
$$|\Delta a[0]||\Sigma\forall_n h[n]| = |\Delta a[0]| = |\beta_0|(1-e^{-T/\tau})/(1+e^{-T/\tau})$$

$$\max|\Delta y_{\Delta a[1]}[n]| = \max|\Delta a[1]h[n] * c[n] * x[n]| = \qquad \text{[Equation 21]}$$
$$0.5|\Delta a[1]||\{h[1] - \Sigma\forall_{n\geq 2}(h[n]-h[n-1])\}| =$$
$$|\Delta a[1]|(1-e^{-T/\tau}) = 2|\beta_1|(1-e^{-T/\tau})/(1+e^{-T/\tau}).$$

When the coefficient error of 20% is applied as shown in FIG. 7, Δa[1] is 0.16, max|Δy$_\Delta$a[1][n]| is approximated to 0.05, and an eye magnitude is about 0.29. It can be seen that this value is enhanced by 80%, compared with 0.16 of FIG. 6. In addition, it can be seen than max|Δy$_{\Delta a[1]}$[n]| is 56% less than max|Δy$_{\Delta w[0]}$[n]| (=0.12) and 33% less than max|Δy$_{\Delta w[1]}$[n]| (=0.08).

A method of the coefficient error robust feed forward equalizer (B-FFE) according the present invention improving robustness, which is described through analysis of a frequency domain, is as follows.

Referring to FIG. 1, a continuous time perturbation function $p_{\Delta w[m]}(t)$ of a pulse transmitted by Δw[m] is derived as shown in Equation (22) below. When δ[n] is input to the conventional feed forward equalizer (C-FFE) as x[n], a spectrum $P_{\Delta w[m]}(f)$ of $p_{\Delta w[m]}(t)$ is derived as shown in Equation (23) below:

$$p_{\Delta w[m]}(t) = \Delta w[m]\Pi_T(t-MT) \qquad \text{[Equation 22]}$$

$$P_{\Delta w[m]}(f) = \Delta w[m]\Lambda_T(f)e^{-j2\pi fmT} = \Lambda_{\Delta w[m],T}(f)e^{-j2\pi fmT}. \qquad \text{[Equation 23]}$$

In Equation (22), the function $\Pi_T(t)$ is defined as 1 when 0≤t<T and 0 otherwise.

In Equation (23), $\Lambda_T(f)=T\text{sinc}(fT)e^{-j\pi fT}$ is a Fourier transform of $\Pi_T(t)$, and $\Lambda_{\Delta w[m],T}(f)=\Delta w[m]\Lambda_T(f)$. In addition, $h_{\Delta w[m]}(t)$, which is a continuous time channel response of $p_{\Delta w[m]}(t)$, and its spectrum $H_{\Delta w[m]}(f)$ are derived from Equation (22) and Equation (23), as shown in Equation (24) and Equation (25) below:

$$h_{\Delta w[m]}(t) = (h * p_{\Delta w[m]})(t) \qquad \text{[Equation 24]}$$

$$H_{\Delta w[m]}(f) = H(f)P_{\Delta w[m]}(f) = H(f)\Lambda_{\Delta w[m],T}(f)e^{-j2\pi fmT}. \qquad \text{[Equation 25]}$$

In Equation (25), $\Lambda_{\Delta w[m],T}(f)$ is a Fourier transform of $\Pi_{\Delta w[m],T}(t)=\Delta w[m]\Pi_T(t)$ that is generated by Δw[m] and x(t)=$\Pi_T(t)$ with respect to a sequence of x[n]=δ[n]. Accordingly, $\Pi_{\Delta w[m],T}(t)$ and $\Lambda_{\Delta w[m],T}(f)$ are defined as an input-port-based coefficient error pulse of Δw[m] and its spectrum.

A continuous time transmission error pulse $p_{\Delta a[m]}(t)$ of Δa[m] and its spectrum in the coefficient error robust feed forward equalizer (B-FFE) according to the present invention are derived from Equation (26) and Equation (27) below:

$$p_{\Delta a[m]}(t) = \begin{cases} \Delta a[0]\Pi_T(t) & m=0 \\ 0.5\Delta a[m]\{\Pi_T(t-(m-1)T) - \Pi_T(t-mT)\} = \\ \Delta d[m]\Pi_T(t-(m-1)T) * c(t) & 1 \leq m \leq N \end{cases} \qquad \text{[Equation 26]}$$

$$P_{\Delta a[m]}(f) = \begin{cases} \Delta a[0]\Lambda_T(f) = \Lambda_{\Delta a[0]T} & n=0 \\ \Delta a[m]\Lambda_T(f)e^{-j2\pi f(m-1)T}C(f) = \\ \Lambda_{\Delta a[m]T}(f)e^{-j2\pi f(m-1)T}C(f) & 1 \leq n \leq N. \end{cases} \qquad \text{[Equation 27]}$$

In this case, c(t)=0.5δ(t)−0.5δ(t−T) denotes a continuous time impulse response of c[n], and C(f)=j sin($\pi fT$)$e^{(-j\pi fT)}$ denotes a spectrum of c(t). Since a continuous time coefficient error pulse response $h_{\Delta a[m]}(t)$ of Δa[m] is $(h*p_{\Delta a[m]})(t)$, a spectrum $H_{\Delta a[m]}(f)$ of $h_{\Delta a[m]}(t)$ may be derived from H(f) and $P_{\Delta a[m]}(f)$, as shown in Equation (28) below:

$$H_{\Delta a[m]}(f) = \begin{cases} H(f)\Lambda_{\Delta a[0]T}(f) & m=0 \\ H(f)\Lambda_{\Delta a[m]T}(f)e^{-j2\pi f(m-1)T}C(f) & 1 \leq m \leq N \end{cases}. \qquad \text{[Equation 28]}$$

As can be seen through Equation (23), Equation (25), Equation (27), and Equation (28), when $\Lambda_{\Delta\_coeff[m],T}(f)=\Delta_{coeff[m]}\Lambda_T(f)$, which is a common expression, is a spectrum of an input-port-based coefficient error response of a coefficient error $\Delta_{coeff[m]}$ when $\Pi_T(t)$ is input as an input pulse. Accordingly, for both of the conventional feed forward equalizer (C-FFE) and the coefficient error robust feed forward equalizer (B-FFE) according to the present invention, $\Delta_{\Lambda\_coeff[m],T}(f)$ is a sinc function. $\Lambda_{\Delta w[m],T}(f)$ for the conventional feed forward equalizer (C-FFE) is filtered only by H(f) as shown in Equation (25) while $\Lambda_{\Delta a[n],T}(f)$ (n≠0) for the coefficient error robust feed forward equalizer (B-FFE) according to the present invention is filtered by a high-pass filter (HPF) c(f) and a low-pass filter (LPF) H(f), as shown in Equation (28). Accordingly, $H_{\Delta a[n]}(f)$ (n≠0) of the coefficient error robust feed forward equalizer according to the present invention is much weaker than $H_{\Delta w[n]}(f)$ of the conventional feed forward equalizer (C-FFE). When n=0, $\Lambda_{\Delta a[0],T}(f)$ has a value that is much less than other values, as expressed in above Equation (19). FIGS. 8A to 8C are graphs for comparing various spectra of the conventional 2-tap feed forward equalizer (C-FFE) and the error robust feed forward equalizer (B-FFE) according to the present invention in a primary RC channel in which a loss of 18 dB occurs at $f_N$.

Figure 8:
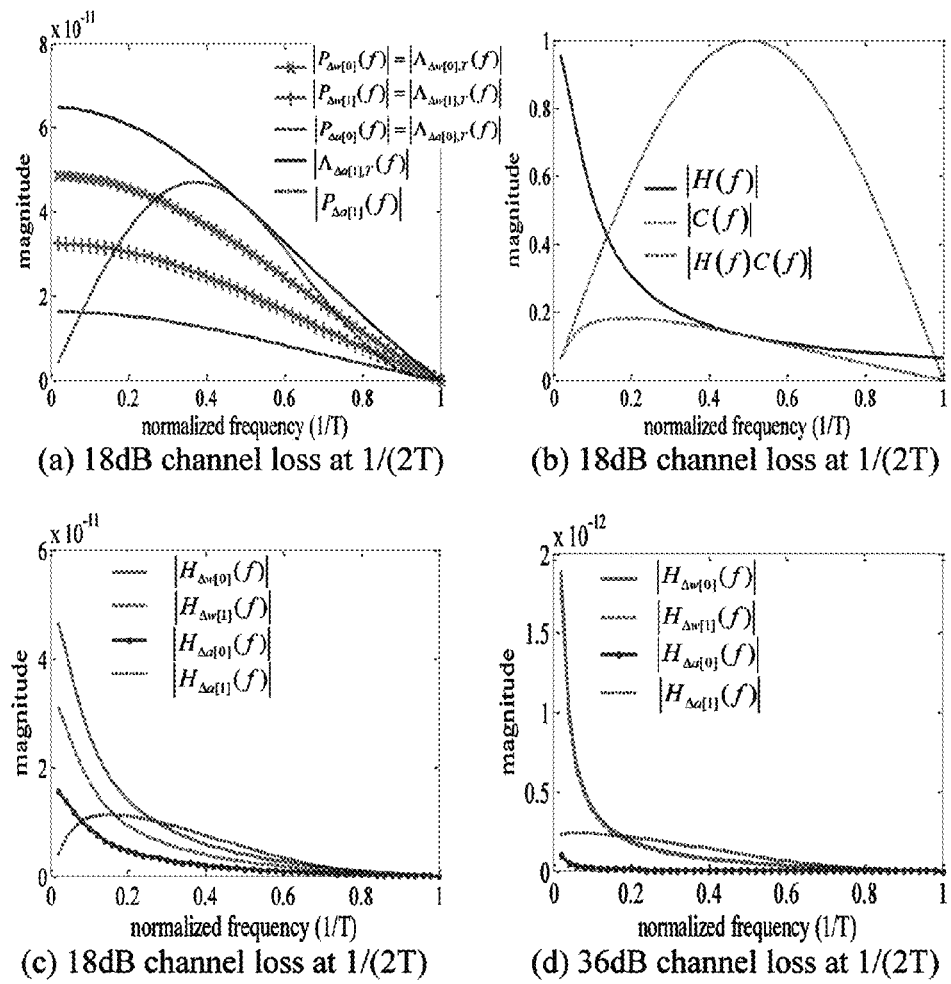
FIG. 8 is a graph comparing spectra between a conventional feed forward equalizer and a coefficient error robust feed forward equalizer according to the present invention.

Referring to FIG. 8A, input-port-based coefficient error pulse spectra $\Lambda_{\Delta w[0],T}(f)$, $\Lambda_{\Delta w[1],T}(f)$, $\Lambda_{\Delta a[0],T}(f)$, and $\Lambda_{\Delta a[1],T}(f)$ of the conventional feed forward equalizer (C-FFE) and the coefficient error robust feed forward equalizer (B-FFE) according to an embodiment of the present invention has the form of a sinc function in which energy is focused on low frequencies. FIG. 8B shows a spectrum of C(f), which is a high-pass filter (HPF). As shown in FIG. 8A, C(f) decreases the magnitude of $P_{\Delta a[1]}(f)$ at low frequencies to have a smaller magnitude than $P_{\Delta w[0]}(f)$ and $P_{\Delta w[1]}(f)$. In addition, referring to FIG. 8B, the spectrum of H(f) decreases rapidly as the frequency increases. Accordingly, as seen in Equation (28), C(f)H(f) has a small magnitude in an entire frequency range. As shown in FIG. 8, $H_{\Delta a[1]}(f)$ is much smaller than $H_{\Delta w[0]}(f)$ or $H_{\Delta w[1]}(f)$. In addition, $H_{\Delta a[0]}(f)$ that is not filtered using a high-pass filter (HPF) c(f) is a value smaller than $H_{\Delta w[0]}(f)$ or $H_{\Delta w[1]}(f)$ according to Equation (19).

The coefficient error robust feed forward equalizer according to the present invention is effective when robustness to a coefficient error is important because of serious channel distribution. FIG. 8D shows a simulation result of the spectrum of FIG. 8C in a 36 dB loss channel. Compared with $H_{\Delta w[0]}(f)$ and $H_{\Delta w[1]}(f)$, it can be seen that $H_{\Delta a[0]}(f)$ and $H_{\Delta a[1]}(f)$ are even smaller in FIG. 8D than in FIG. 8C. Accordingly, the coefficient error robust feed forward equalizer (B-FFE) according to the present invention provides a much better improvement effect for a high loss channel.

The eye diagram is widely used to measure the quality of communication. Accordingly, in order to quantify the robustness of the feed forward equalizer (FFE), the number of coefficient errors that can be endured by the eye diagram is quantified using sensitivity $S_{\kappa[n]}$ to an nth feed forward equalizer (FFE) coefficient $\kappa[n]$. As shown in Equation (29), $S_{\kappa[n]}$ may be derived by dividing a decreasing rate of an eye height decreasing value $\Delta v_{eye,\Delta\kappa[n]}$ of $\Delta\kappa[n]$ from an optimal eye height $v_{eye}$ by an error rate of $\kappa[n]$. In this case, a different coefficient error is substituted with zero (0).

$$S_{\kappa[n]} = \frac{\left|\frac{\Delta v_{eye,\Delta\kappa[n]}}{v_{eye}}\right|}{\left|\frac{\Delta\kappa[n]}{\kappa[n]}\right|}. \quad \text{[Equation 29]}$$

When the eye sensitivity of the feed forward equalizer FFE is high, the eye diagram of the feed forward equalizer (FFE) is further sensitive to the coefficient error. Accordingly, the eye sensitivity is useful as a method for measuring the robustness.

When there is no perturbation, a 2-tap feed forward equalizer (FFE) for a primary RC channel theoretically has a perfect eye. According to FIG. 6 and Equation (3), the eye height $v_{eye}$ may be determined as $2g_{opt[1]\ by\ gopt}[n]$, as shown in Equation (30) below:

$$v_{eye}=2(1-e^{-T/\tau})/(1+e^{-T/\tau}). \quad \text{[Equation 30]}$$

As aforementioned, since $\Delta v_{eye,\Delta w[m]}=-2\max|\Delta y_{\Delta w[m]}[n]|$, w[0] and w[1] have eye sensitivity according to Equation (2), Equation (15), and Equation (16), as shown in Equation (31) and Equation (32) below:

$$S_{w[0]} = \frac{\left|\frac{\Delta v_{eye,\Delta w[0]}}{v_{eye}}\right|}{\left|\frac{\Delta w[0]}{w[0]}\right|} = \frac{\left|\frac{2\Delta w[0]}{v_{eye}}\right|}{\left|\frac{\Delta w[0]}{w[0]}\right|} = \frac{1}{1-e^{-T/\tau}} \quad \text{[Equation 31]}$$

$$S_{w[1]} = \frac{\left|\frac{\Delta v_{eye,\Delta w[1]}}{v_{eye}}\right|}{\left|\frac{\Delta w[1]}{w[1]}\right|} = \frac{\left|\frac{2\Delta w[1]}{v_{eye}}\right|}{\left|\frac{\Delta w[1]}{w[1]}\right|} = \frac{e^{-T/\tau}}{1-e^{-T/\tau}}. \quad \text{[Equation 32]}$$

When $T \ll \pi\tau$, Equation (31) and Equation (32) can be approximated to Equation (33) and Equation (34) using a Taylor series ($e^{-T/\tau} \approx 1-T/\tau$) and channel frequency $f_N$ characteristics ($H(f_N)=1/(1+j2\pi f_N\tau) \approx T/(j\pi\tau)$), respectively.

$$S_{w[0]} \approx \frac{\tau}{T} = \frac{1}{\pi|H(f_N)|} \quad \text{if } T \ll \pi\tau \quad \text{[Equation 33]}$$

$$S_{w[1]} \approx \frac{\tau}{T} = \frac{1}{\pi|H(f_N)|} \quad \text{if } T \ll \pi\tau. \quad \text{[Equation 34]}$$

Figure 9:
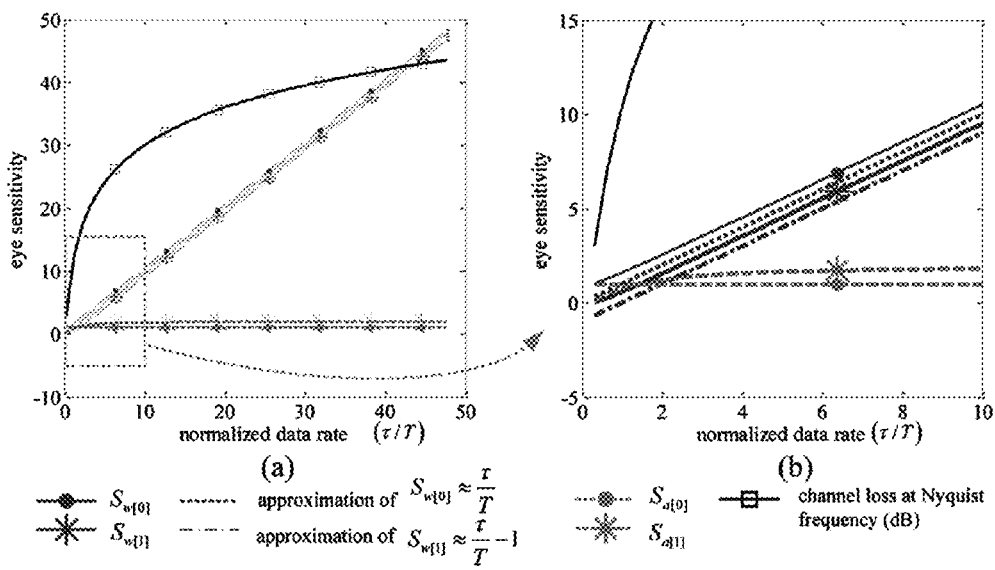
FIG. 9 is a graph showing the eye sensitivities of a conventional 2-tap feed forward equalizer for a primary RC channel and a coefficient error robust feed forward equalizer according to the present invention.

FIG. 9 is a graph showing the eye sensitivity and $|H(f_N)|$ of a conventional 2-tap feed forward equalizer (C-FFE) for a primary RC channel and a coefficient error robust feed forward equalizer (B-FFE) according to the present invention. Referring to FIG. 9, it can be seen that Equation (33) and Equation (34) are similar to Equation (31) and Equation (32), respectively.

When T is decreased for a high data rate, channel losses and $S_{w[0]}$ and $S_{w[1]}$ increase almost linearly to infinity as the denominator $(1-e^{-T/\tau})$ converges to 0. When $T=\tau$, the channel loss is 10 dB, $S_{w[0]}=1.58$, and $S_{w[1]}=0.58$. When $T=0.1\tau$, the channel loss is 30 dB, $S_{w[0]}=10.5$, and $S_{w[1]}=9.5$. The worse eye sensitivity when $T=0.1\tau$ is 6.6 times higher than the worse eye sensitivity when $T=\tau$.

In general, when a data rate is high and channel loss is high, eye sensitivity is also very high. The high eye sensitivity denotes amplification of the coefficient error. Accordingly, since even a very small coefficient error can close the eye diagram, a designer should strictly control variation of coefficients even if hardware areas and power are consumed excessively.

When $T=0.1\tau$, the w[0] error of 1.9% may reduce an eye height by 20%. When $T=\tau$, the w[0] error of 12.6% reduces an eye height by the same percentage as above. Accordingly, a high cost is required to design the FFE in a very high loss channel with a loss of 30 dB or greater.

Accordingly, the coefficient error robust feed forward equalizer (B-FFE) according to the present invention has an effect of improving eye sensitivity in a very large loss channel. An optimal coefficient $\underline{a}_{opt}$ for a primary RC channel of the coefficient error robust feed forward equalizer (B-FEE) according to the present invention is derived using Equation (2) and Equation (12), as shown in Equation (35) below:

$$\underline{a}_{opt}=(B_x^T)^{-1}\underline{w}_{opt}=[(1-e^{-T/\tau})/(1+e^{-T/\tau})2e^{-T/\tau}/(1+e^{-T/\tau})]^T. \quad \text{[Equation 35]}$$

The eye sensitivity of the coefficient error robust feed forward equalizer (B-FFE) according to the present invention is derived from $h_{\Delta a[m]}[n]$ of Equation (17) and Equation (18). It can be seen from Equation (14) and Equation (17) that $\max|\Delta y_{\Delta a[0]}[n]|$ is $|\Delta a[0]|$. Since $\Delta v_{eye}=-2\max|\Delta y_{\Delta a[0]}[n]|$, $\Delta v_{eye}=-2|\Delta a[0]|$. In addition, when $v_{eye}=2g_{opt}[n]$ and $g_{opt}[n]=a[0]$, $v_{eye}=2a[0]$. Accordingly, the eye sensitivity of $\Delta a[0]$ ($S_{a[0]}$) may be derived from Equation (36) below:

$$S_{a[0]} = \left.\frac{\left|\frac{\Delta v_{eye}}{v_{eye}}\right|}{\left|\frac{\Delta a[0]}{a[0]}\right|}\right|_{\Delta a[1]=0} = \frac{\left|\frac{2\Delta a[0]}{2a[0]}\right|}{\left|\frac{\Delta a[0]}{a[0]}\right|} = 1. \quad [\text{Equation 36}]$$

FIG. 9 shows that $S_{w[0]}$ and $S_{w[1]}$ increase as the data rate increases, but $S_{a[0]}=1$. Accordingly, although the data rate is very high, the influence of $\Delta a[0]$ is not amplified by the eye sensitivity of the coefficient error robust feed forward equalizer (B-FFE) according to the present invention.

$\max|\Delta y_{\Delta a[1]}[n]|=\Delta a[1]|(1-e^{-T/\tau})$ is derived from Equation (14) and Equation (18), and $\Delta v_{eye,\Delta a[1]}=-2\max|\Delta y_{\Delta a[1]}[n]|=2|\Delta a[1]|(1-e^{-T/\tau})$. When Taylor series approximation is applied to Equation (30) and Equation (35), $S_{a[1]}$ is simplified as shown in Equation (37) below:

$$S_{a[1]} = \left.\frac{\left|\frac{\Delta v_{eye}}{v_{eye}}\right|}{\left|\frac{\Delta a[1]}{a[1]}\right|}\right|_{\Delta a[1]=0} = \frac{\left|\frac{2\Delta a[1](1-e^{-T/\tau})}{v_{eye}}\right|}{\left|\frac{\Delta a[1]}{a[1]}\right|} = 2e^{-T/\tau} \approx 2(1-T/\tau). \quad [\text{Equation 37}]$$

As can be seen from FIG. 9 and Equation (37), $S_{a[1]}$ increases and converges to '2' as the data rate increases.

FIG. 9 is a graph showing the eye sensitivities of the conventional feed forward equalizer (C-FFE) and the coefficient error robust feed forward equalizer (B-FFE) according to the present invention with respect to the data rate. It can be seen that the eye sensitivity of the conventional feed forward equalizer (C-FFE) increases to infinity, and the eye sensitivity of the coefficient error robust feed forward equalizer (B-FFE) according to the present invention converges to 1 or 2.

Accordingly, the difference in eye sensitivity between the conventional feed forward equalizer (C-FFE) and the coefficient error robust feed forward equalizer (B-FFE) according to the present invention, which is a degree of robustness enhancement, increases to infinity as the data increases. When the channel loss is 10 dB ($\tau/T=1$), 30 dB ($\tau/T=10$), and 40 dB ($\tau/T=31.8$), $S_{a[0]}=1$, $S_{a[1]}=1.8$, and $S_{a[1]}=1.9$, respectively, which are the worst eye sensitivities of the coefficient error robust feed forward equalizer (B-FFE) according to the present invention. This result shows improvement by factors of 1.54, 5.9, and 17, compared with $S_{w[0]}=1.54$, 10.6, and 32.3, which are the worst eye sensitivities of the above-described conventional feed forward equalizer (C-FFE).

In order to clarify analysis of eye sensitivity, the eye sensitivity of the conventional feed forward equalizer (C-FFE) and the coefficient error robust feed forward equalizer (B-FFE) according to the present invention will be described below through numeric analysis.

Figure 10:
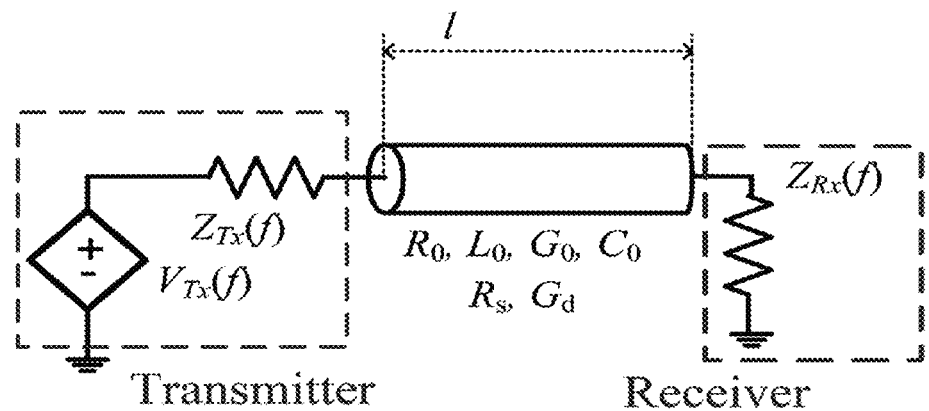
FIG. 10 is a view showing an example of a loss transmission line channel model.

An actually used channel may be modeled as a lossy transmission line as shown in FIG. 10. A transfer function of the lossy transmission line is derived using a telegrapher equation and a telegrapher equation including a secondary impact of a frequency dependent channel, as shown in Equation (38), Equation (39), Equation (40), and Equation (41) below:

$$H(f) \approx \frac{2e^{-l\sqrt{(R+j2\pi fL_0)(G+j2\pi fC_0)}}}{(1+Z_{Tx}(f)/Z_c(f))(1+Z_c(f)/Z_{Rx}(f))} \quad [\text{Equation 38}]$$

$$Z_c(f) = \sqrt{(R+j2\pi fL_0)/(G+j2\pi fC_0)} \quad [\text{Equation 39}]$$

$$R = R_0 + R_s\sqrt{f}(1+j) \quad [\text{Equation 40}]$$

$$G = G_0 + fG_d. \quad [\text{Equation 41}]$$

In Equation (38), Equation (39), Equation (40), and Equation (41), H(f) is a frequency response of a channel having a length of l, $Z_c(f)$ is a characteristic impedance of a channel, $Z_{Tx}(f)$ and $Z_{Rx}(f)$ are terminal impedances of a transmitter and a receiver, respectively, $R_0$, $L_0$, $G_0$, and $C_0$ are RLGC variables of the channel in DC, and $R_s$ and $G_d$ are variables that model a skin effect and dielectric loss, respectively. A frequency response of a printed circuit board (PCB) or package wire may be mathematically calculated from Equation (38), Equation (39), Equation (40), and Equation (41).

Figure 11:
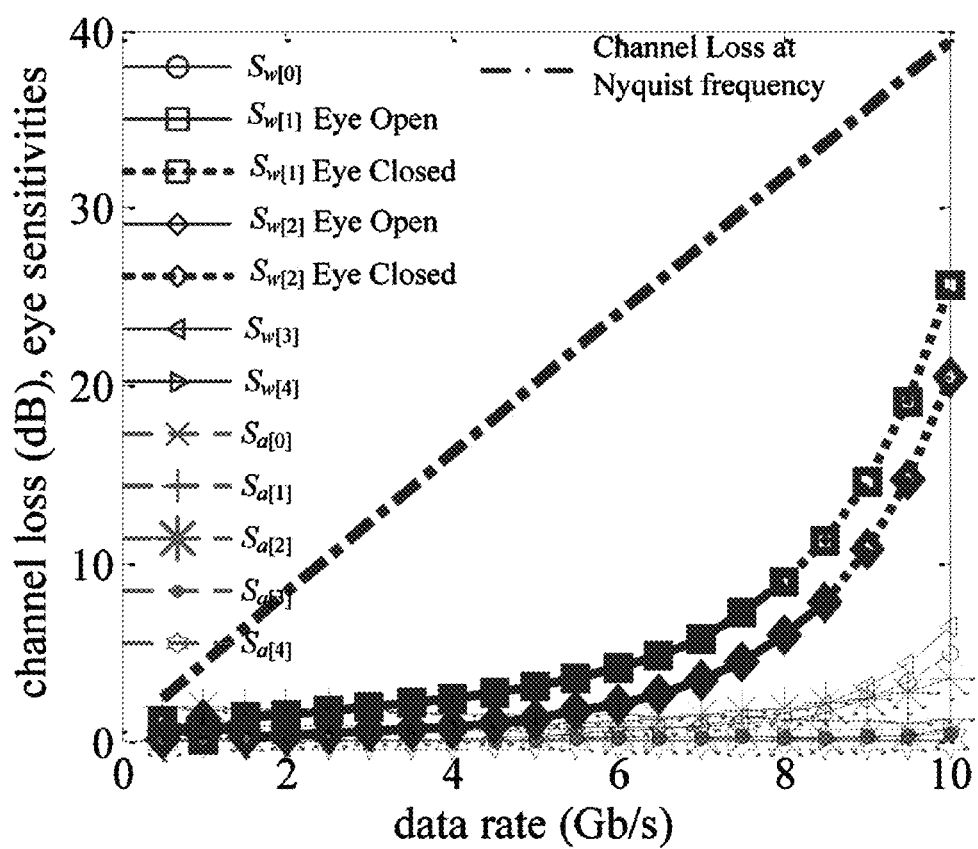
FIG. 11 is a graph showing eye sensitivities and channel losses at the Nyquist frequency of a conventional 5-tap feed forward equalizer and a feed forward equalizer according to the present invention in a 40 cm PCB channel.

FIG. 11 is a graph showing, in a 40-cm PCB channel, eye sensitivities and channel losses at the Nyquist frequency of the conventional 5-tap feed forward equalizer (C-FFE) and the 5-tap coefficient error robust feed forward equalizer (B-FFE) according to the present invention.

In order to calculate the eye sensitivity, an eye height decreased due to a coefficient error of 10% is calculated first. The worst case analysis is used for a sequence length corresponding to a bit error rate (BER) of $10^{-18}$. Several closed eyes are represented by dotted lines of FIG. 11. In order to depict a closed eye diagram, a difference between a minimum signal magnitude of a bit of '1' and a maximum signal magnitude of a bit of '0' is defined as an eye height. When an eye is closed, the defined eye height is negative, and the negative eye height indicates how much the worse signal level is enhanced in order to open the eye diagram.

Referring to FIG. 11, the eye sensitivity of the coefficient error robust feed forward equalizer (B-FFE) is much smaller than that of the conventional feed forward equalizer (C-FFE). When the Nyquist channel loss is about 40 dB, and the data rate is 10 Gb/s, the worst eye sensitivity $S_{a[2]}$ of the coefficient error robust feed forward equalizer (B-FFE) according to the present invention is 3.55, and the eye sensitivity $S_{w[1]}$ of the conventional feed forward equalizer (C-FFE) is 25.7. That is, according to the present invention, there is an effect of improving eye sensitivity by a factor of about 7, compared with the conventional feed forward equalizer (C-FFE), and w[1] should be controlled seven times more accurately than a[2]. If a decrease in eye size of 20% is allowed, w[1] requires accuracy of at least 0.77% while a[2] requires accuracy of 5.63%. Since a method of securing accuracy of 0.77% in nano technology is very expensive, the conventional feed forward equalizer operating at 10 Gb/s is not practical. However, the present invention requires an accuracy of just 5.63% under the same condition, and thus there is an effect of easily achieving 10 Gb/s.

Figure 12:
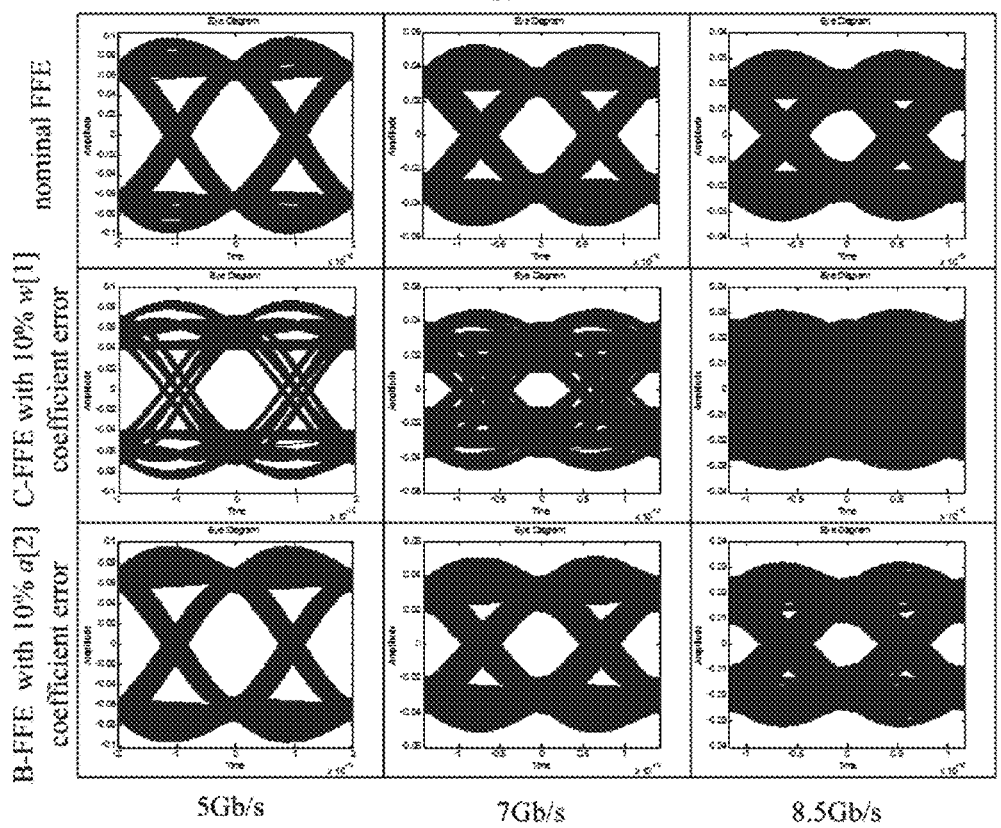
FIG. 12 is a graph showing an eye diagram for each data transmission rate of FIG. 11.

FIG. 12 is an eye diagram at 5 Gb/s, 7 Gb/s, and 8.5 Gb/s, which are selected from FIG. 11. Here, it is assumed that all coefficients have an error of 10%. Nyquist channel losses are 20 dB, 27.9 dB, and 33.6 dB, respectively. When the data rate is increased, the coefficient robust feed forward equalizer (B-FFE) according to the present invention has a slightly deteriorated form in an eye diagram in a normal state while an eye diagram of the conventional feed forward equalizer (C-FFE) is closed quickly. That is, according to the present invention, there is an effect of overcoming the limitation of robustness that has occurred in high-speed interconnect.

Figure 13:
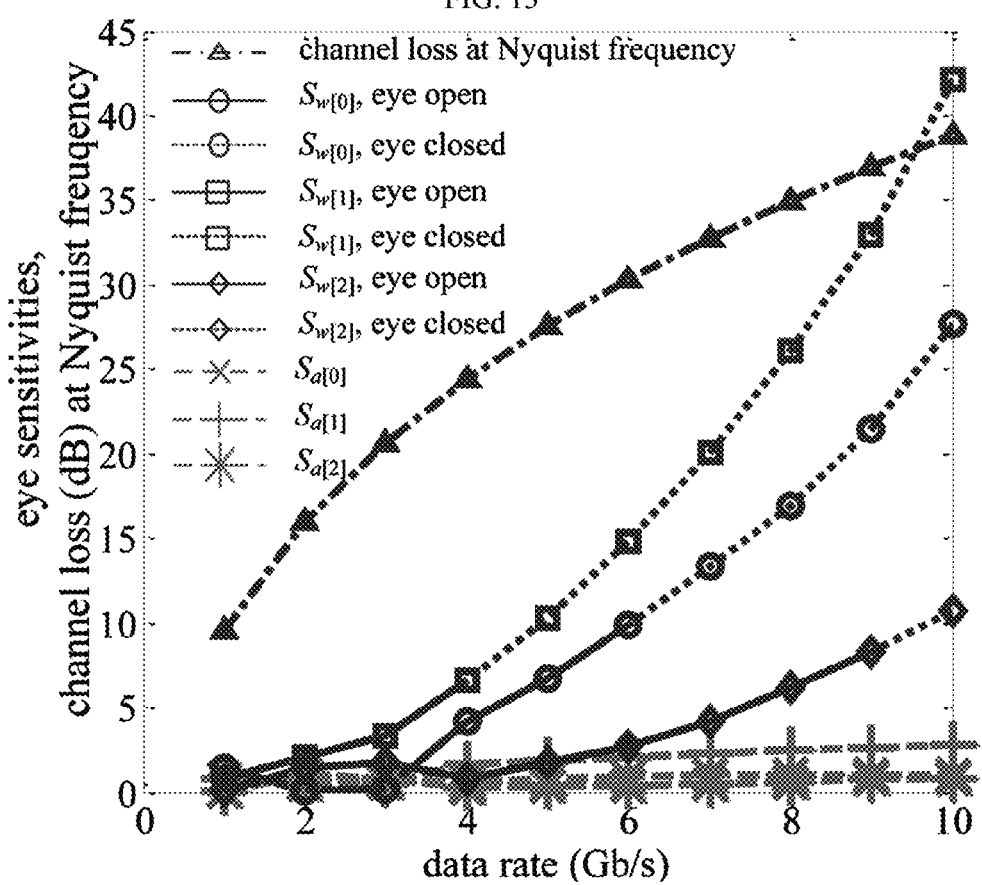
FIG. 13 is a graph showing the eye sensitivities of a conventional 3-tap feed forward equalizer and a feed forward equalizer according to the present invention in a 3.5 cm silicon interposer package.

In a 3.5 cm silicon interposer package, the eye sensitivities of the conventional 3-tap feed forward equalizer (C-FFE) and the 3-tap coefficient error robust feed forward equalizer (B-FFE) according to the present invention may be calculated. FIG. 13 is a graph showing the channel loss at the Nyquist frequency and the eye sensitivities of the conventional feed forward equalizer (C-FFE) and the coefficient error robust feed forward equalizer (B-FFE) with respect to the data rate. Since the channel length is short as 3.5 cm, but the channel width is small, the channel loss at 10 Gb/s is large as 38.8 dB. In 10 Gb/s, the coefficient error robust feed forward equalizer (B-FFE) according to the present invention improves the eye sensitivity by a factor of 15 or more compared to the conventional feed forward equalizer (C-FFE).

Figure 14:
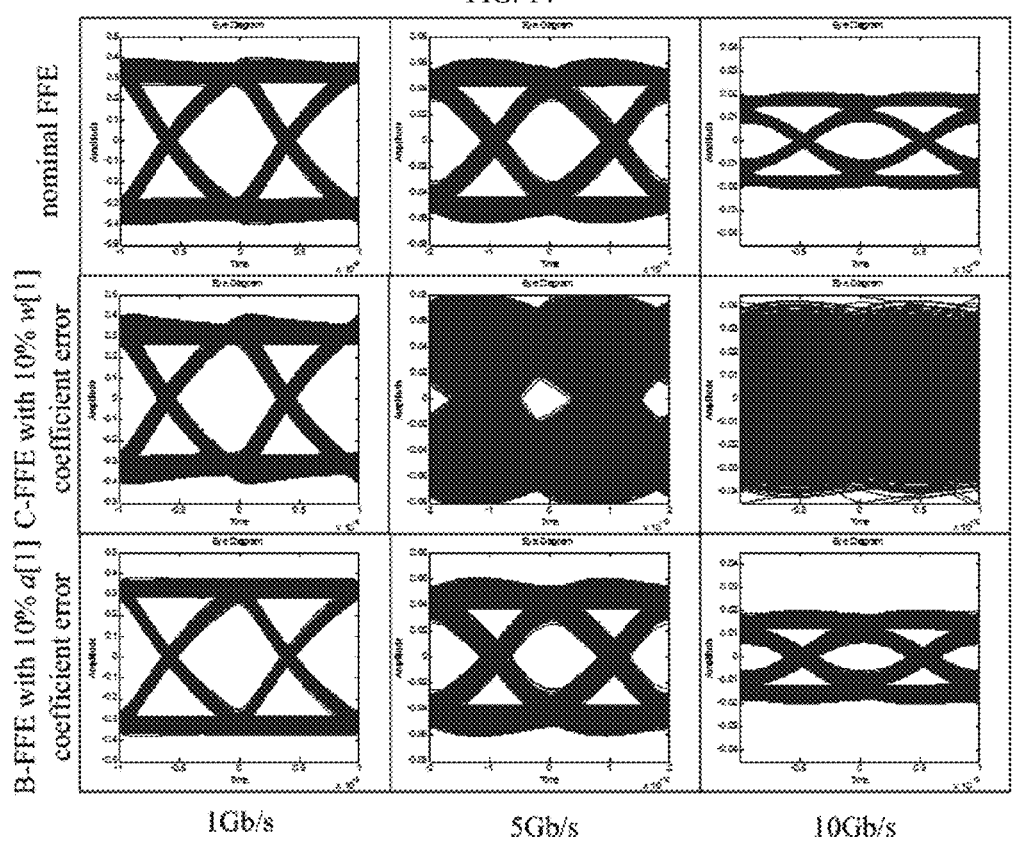
FIG. 14 is a graph showing eye diagrams for data transmission rates of FIG. 13.

FIG. 14 is a graph for comparing 1-Gb/s, 5-Gb/s, 10-Gb/s eye diagrams of the coefficient error robust feed forward equalizer (B-FFE) according to the present invention and the conventional feed forward equalizer (C-FFE) in a normal state when the coefficient error of 10% has occurred. In this case, the Nyquist channel losses are 9 dB, 27.5 dB, and 38.8 dB at 1 Gb/s, 5 Gb/s, and 10 Gb/s, respectively. Referring to FIG. 14, the eye diagram of the conventional feed forward equalizer (C-FFE) is quickly closed while the eye diagram of the coefficient error robust feed forward equalizer (B-FFE) according to the present invention is maintained open even when the data rate increases. Referring to FIGS. 13 and 14, there is an effect of improving robustness to the coefficient error, and in particular, an effect of securing robustness when the data rate is high and thus the issue of robustness is serious.

The invention claimed is:

1. A coefficient error robust feed forward equalizing transmitter comprising:
   an input terminal (130) configured to receive input data (x) according to an integer time index (n);
   a plurality of delay units (D) connected in series with the input terminal (130), wherein said delay units are configured to output tap signals;
   a data change detection filter (120) disposed between two adjacent delay units among the plurality of delay units, connected in series with the two adjacent delay units, and configured to output a data transition value based on a change in the input data (x); and
   a first calculator (110) configured to sum the tap signals, wherein the delay units connected behind the data change detection filter output the tap signals based on the data transition value output by the data change detection filter (120).

2. The coefficient error robust feed forward equalizing transmitter of claim 1, wherein the data change detection filter (120) comprises one delay unit (122) and a second calculator (121) connected with the one delay unit (122), and the second calculator (121) calculates the data transition value based on a previous value input to the delay unit (122) and a current value output from the delay unit (122).

3. The coefficient error robust feed forward equalizing transmitter of claim 2, wherein the data change detection filter (120) calculates the data transition value based on the following equation: $b[n-m]=0.5x[n-m+1]-0.5x[n-m]$ where n and m are integers (n>m).

4. The coefficient error robust feed forward equalizing transmitter of claim 2, wherein the data transition value is calculated through logic circuit combination of a plurality of consecutive digital bit values in a data stream.

5. The coefficient error robust feed forward equalizing transmitter of claim 1, wherein the data change detection filter (120) is a high-pass filter (HPF).

6. The coefficient error robust feed forward equalizing transmitter of claim 1, wherein, each of the tap signals includes a feed forward equalizer coefficient, and the feed forward equalizer coefficient is adjustable by a user.

\* \* \* \* \*